United States Patent
Shojayi et al.

(10) Patent No.: US 8,107,475 B1
(45) Date of Patent: Jan. 31, 2012

(54) METHOD AND PROCEDURE FOR INCREASING IPV4 ADDRESS SPACE

(75) Inventors: Joseph Christopher Shojayi, Overland Park, KS (US); Jeremy R. Breau, Leawood, KS (US); Frederick C. Rogers, Olathe, KS (US); Terry D. Nebergall, Gardner, KS (US); John H. Bennett, Lawrence, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 197 days.

(21) Appl. No.: 12/437,300

(22) Filed: May 7, 2009

(51) Int. Cl.
*H04J 3/22* (2006.01)
(52) U.S. Cl. .................... 370/392; 370/466
(58) Field of Classification Search .............. None
See application file for complete search history.

(56) References Cited

U.S. PATENT DOCUMENTS

2006/0165062 A1* 7/2006 Nishida et al. ............. 370/352
2009/0304026 A1* 12/2009 Hamada .................... 370/466

OTHER PUBLICATIONS

AX Series: IPv$ & IPv6 Dual Stack, http://www.a10networks.com/products/axseries-ipv.php.

Durand, Alain, Sharing a Single IPv4 Address Among Many Broadband Customers, pp. 1-9, http://www.nanog. org/mtg-0710/presentations/Durand-lightning.pdf.
IPV4 Address Exhaustion, http://en.wikipedia.org/wiki/IPv4_address_exhaustion.
Network Address Translation, http://en.wikipedia.org/wiki/Network_address_translation.
Iljitsch Van Beijnum, IPv4 Address Consumption, The Internet Protocol Journal, vol. 10, No. 3., http://www. cisco.com/web/about/ac123/ac147/archived_issues/ipj_ 10-3/103_addr-cons.html.
Classless and Subnet Address Extensions, http:triton.towson.edu/~rhammell/Ait622/Chap09_post.ppt#370,1,Classless.
Reverse DNS Lookup, retrieved Apr. 16, 2010, 3 pages, http://en.wikipedia.org/wiki/Reverse_DNS_Lookup.
Domain Name System, retrieved Apr. 16, 2010, 15 pages, http://en.wikipedia.org/wiki/Domain_Name_ System.

* cited by examiner

*Primary Examiner* — Chirag Shah
*Assistant Examiner* — Salvador E Rivas

(57) ABSTRACT

Systems and methods for routing IPv4 packets based on a variation in a field in a header of the IPv4 packets are provided. In particular, IPv4 packets are routed based on variation in a version field in a header of IPv4 packets. By varying the version value in the version field in the header of IPv4 packets, and combining the version value with a destination address value in a destination address field to comprise a unique routing address, the number of usable IPv4 addresses is increased.

7 Claims, 7 Drawing Sheets

| + | Bits 0-3 | 4-7 | 8-15 | 16-18 | 19-31 |
|---|---|---|---|---|---|
| 0 | Version | Header length | Type of Service (now DiffServ and ECN) | Total Length | |
| 32 | Identification | | | Flags | Fragment Offset |
| 64 | Time to Live | | Protocol | Header Checksum | |
| 96 | Source Address | | | | |
| 128 | Destination Address | | | | |
| 160 | Options | | | | |
| 160 or 192+ | Data | | | | |

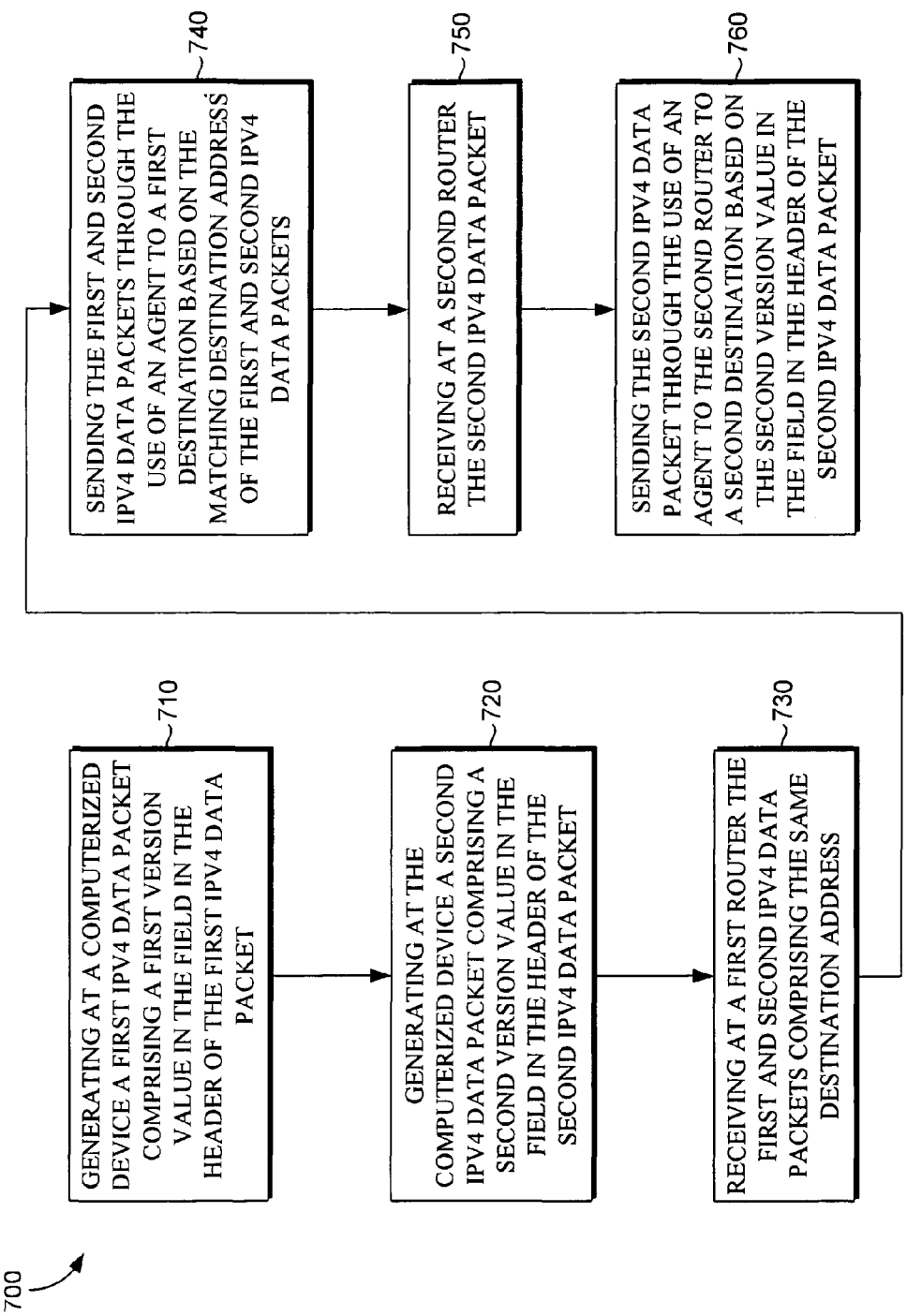

METHOD AND PROCEDURE FOR INCREASING IPV4 ADDRESS SPACE

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed description section. This summary is not intended to identify key features or essential features of the claimed subject matter, nor is it intended to be used as an aid in isolation to determine the scope of the claimed subject matter.

Embodiments of the present invention provide methods for, among other things, routing IPv4 packets based on a variation in a field in a header of the IPv4 packets. The present invention may apply to communications received from a mobile communications device, for instance, that is Internet Protocol version 4 (IPv4) capable, and may allow the mobile device to establish an IPv4 session utilizing a variation in a version field of an IPv4 header that is currently not used for routing addresses. By doing so, the present invention allows the number of IPv4 addresses to expand to a number that is more sustainable as the current number of available IPv4 addresses begin to run out.

In a first aspect, a method is provided for routing IPv4 packets based on a variation in a field in a header of the IPv4 packets. Initially, a first IPv4 packet is received at a router. The first IPv4 packet includes a first version value in the field in the header of the first IPv4 packet. The first version value in the field in the first IPv4 packet is identified. The first IPv4 packet is sent to a first destination based on the first version value in the field in the header of the first IPv4 packet. Additionally, a second IPv4 packet is received at the router. The second IPv4 packet includes a second version value in the field in the header of the second IPv4 packet. The second version value is in the field in the header of the second IPv4 packet. The second version value in the field in the second IPv4 packet is identified as being distinct from the first version value. As such, the second IPv4 packet is sent to a second destination based on the second version value in the field in the header of the second IPv4 packet.

In a second aspect, a further method is provided for routing IPv4 packets based on a variation in a field in a header of the IPv4 packets. A first IPv4 packet is received at a router. The first IPv4 packet includes a first version value and a first destination address value, each in a field in the header of the first IPv4 packet. The destination address field is distinct from the version field in the IPv4 header. The first destination address value in the field of the first IPv4 packet is identified. The first IPv4 packet is sent to a first destination based on the destination address value in the field in the header of the first IPv4 packet. Additionally, a second IPv4 packet is received at the first router. The second IPv4 packet includes a second version value and a second destination address value, each in a field in the header of the second IPv4 packet. The second destination address value in the field in the second IPv4 packet is identified. The second IPv4 packet is sent to a second destination based on the second destination address in the field in the header of the second IPv4 packet. The second IPv4 packet is received at a second router. At the second router, the second version value and the second destination address value in the fields in the second IPv4 packet are identified. The second IPv4 packet is sent to a third destination based on the second version value and the second destination address value in the field in the header of the second IPv4 packet.

In a third aspect, an exemplary computerized system is provided for routing IPv4 data packets based on a variation in a field in a header of the IPv4 packets, the computerized system including a processor coupled to a memory. The exemplary system includes a computerized device to generate a first IPv4 data packet and a second IPv4 data packet. The first IPv4 packet includes a first version value in the field in the header of the first IPv4 data packet and the second IPv4 packet includes a second version value in the field in the header of the second IPv4 data packet. The system also includes a router to receive the first and second IPv4 data packets, wherein the first version value in the field in the header of the first IPv4 data packet differs from the second version value in the field in the header of the second IPv4 data packet. The system also includes an agent at the router to send the first IPv4 data packet to a first destination based on the first version value and a destination address in the first IPv4 data packet. Further, the system includes the agent at the router to send the second IPv4 data packet to a second destination based on the second version value and the destination address in the second IPv4 data packet.

In a fourth aspect, another exemplary computerized system is provided for routing IPv4 data packets based on a variation in a field in a header of the IPv4 data packets, the computerized system including a processor coupled to a memory. The computerized system includes a computerized device to generate a first IPv4 data packet and a second IPv4 data packet. The first IPv4 packet includes a first version value in the field in the header of the first IPv4 data packet and the second IPv4 packet includes a second version value in the field in the header of the second IPv4 data packet. The system also includes a first router to receive the first and second IPv4 data packets. In this aspect, the destination address value in the field in the header of the first IPv4 data packet matches a destination address value in the field in the header of the second IPv4 data packet. Additionally, the destination address value is in a field that is not the version field in the IPv4 header. The system also includes an agent at the first router to send the first and second IPv4 data packets to a first destination based on the destination address value in the field in the header in the first and second IPv4 data packets. The system further includes a second router to receive the second IPv4 data packet. Additionally, the system includes an agent at the second router to send the second IPv4 data packet to a second destination based on the second version value in the field in the header of the second IPv4 data packet.

BRIEF DESCRIPTION OF THE SEVERAL VIEWS OF THE DRAWINGS

Illustrative embodiments of the present invention are described in detail below with reference to the attached drawing figures, and wherein:

FIG. 1 illustrates an exemplary IPv4 header known in the prior art;

FIG. 7 provides another flow diagram of a computerized system for routing IPv4 data packets based on a variation in a field in a header of the IPv4 packets.

DETAILED DESCRIPTION

Figure 2:
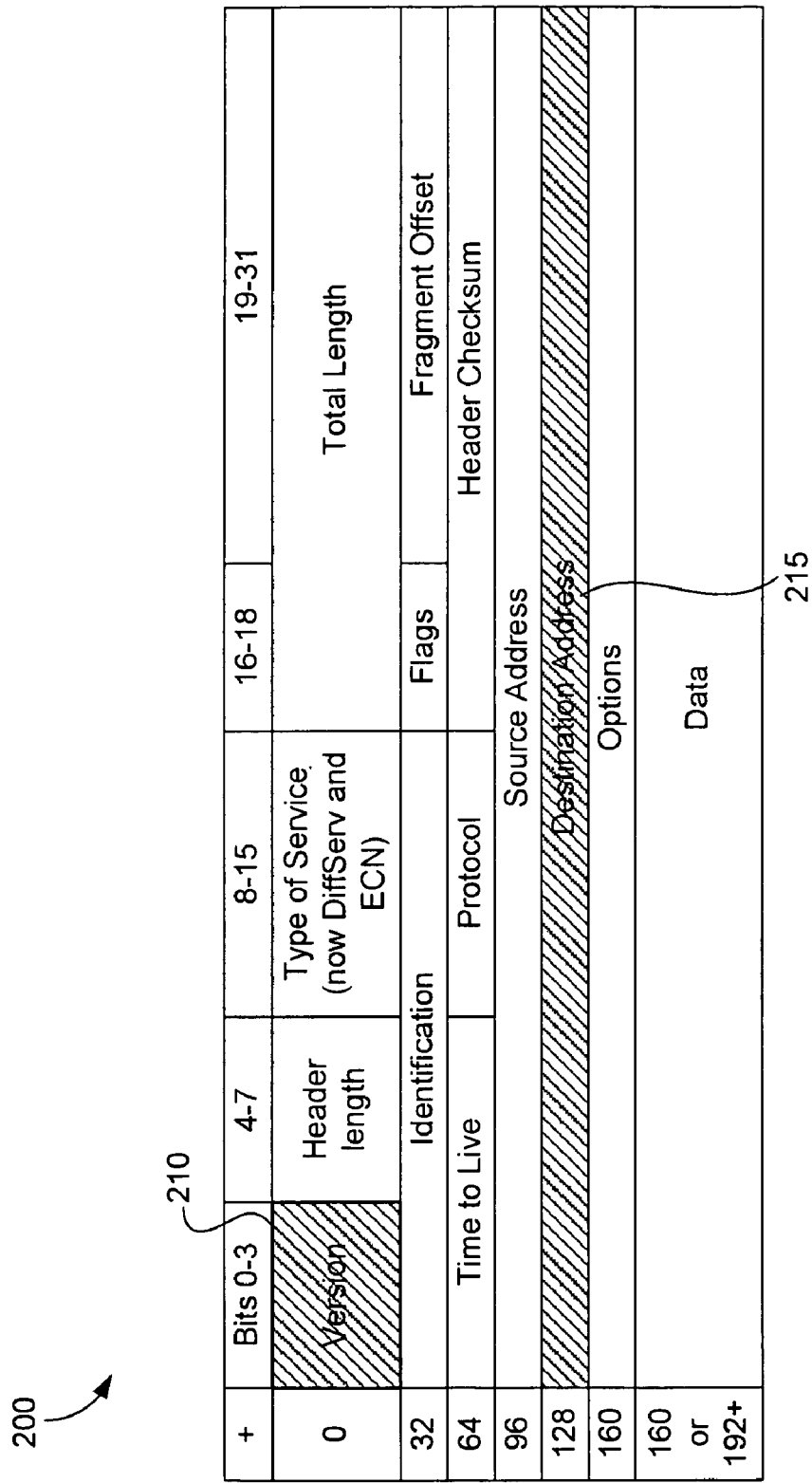
FIG. 2 illustrates an exemplary IPv4 header with a varying protocol version field in accordance with an implementation of an embodiment of the invention.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms and shorthand notations:

| | |
|---|---|
| CD | Compact Disc |
| CD-ROM | Compact Disk Read Only Memory |
| DVD | Digital Versatile Discs |
| EEPROM | Electrically Erasable Programmable Read Only Memory |
| IP | Internet Protocol |
| IPv4 | Internet Protocol Version 4 |
| IPv6 | Internet Protocol Version 6 |
| LAN | Local Access Network |
| MP3 | MPEG-1 Audio Layer 3 |
| PC | Personal Computer |
| PDA | Personal Digital Assistant |
| RAM | Random Access Memory |
| ROM | Read Only Memory |
| WAN | Wide Area Network |
| WAP | Wireless Application Protocol |

Further, various technical terms are used throughout this description. An illustrative resource that fleshes out various aspects of these terms can be found in Newton's Telecom Dictionary by H. Newton, 24$^{th}$ Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a data store, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Some of these technologies are referred to as computer-storage media.

Embodiments of the present invention provide systems, methods, and computer-readable media for routing IPv4 packets based on a variation in a field in a header of the IPv4 packets. Currently, IPv4 packets are transmitted to a destination based on a destination address value in a destination address field in the IPv4 header. Another piece of information that is included in the IPv4 header is the version field. However, the version field of the IPv4 header is not currently used by many routers as a component of an IPv4 header used in routing the IPv4 packets. As such, the variance of the version field in the IPv4 header is not used by these routers as a way of distinguishing destination addresses for IPv4 packets.

The present invention provides systems and methods for varying a version field in a header in an IPv4 packet as a means of increasing the number of IPv4 addresses available. By utilizing a new field for variance, the information used in the destination address field may repeat current IPv4 header information and be used in conjunction with a new IPv4 version field to create a new IPv4 header. To implement this invention, the current software used in many routers that disregards a version field of a IPv4 header may be adjusted to recognize the version field of the IPv4 header as a means of variance.

FIG. 1 illustrates an exemplary IPv4 header 100 known in the prior art.

FIG. 2 illustrates an exemplary IPv4 header 200 with a varying protocol version field in accordance with an embodiment of the invention. Similar to FIG. 1, as shown in FIG. 2, the IPv4 header 200 comprises a version field 210 with four bits and a destination address field 215. In embodiments of the invention, both the version field 210 and destination address field 215 may be used together to distinguish an IPv4 routing address, where an IPv4 routing address may have a version value and a destination address value.

Figure 3:
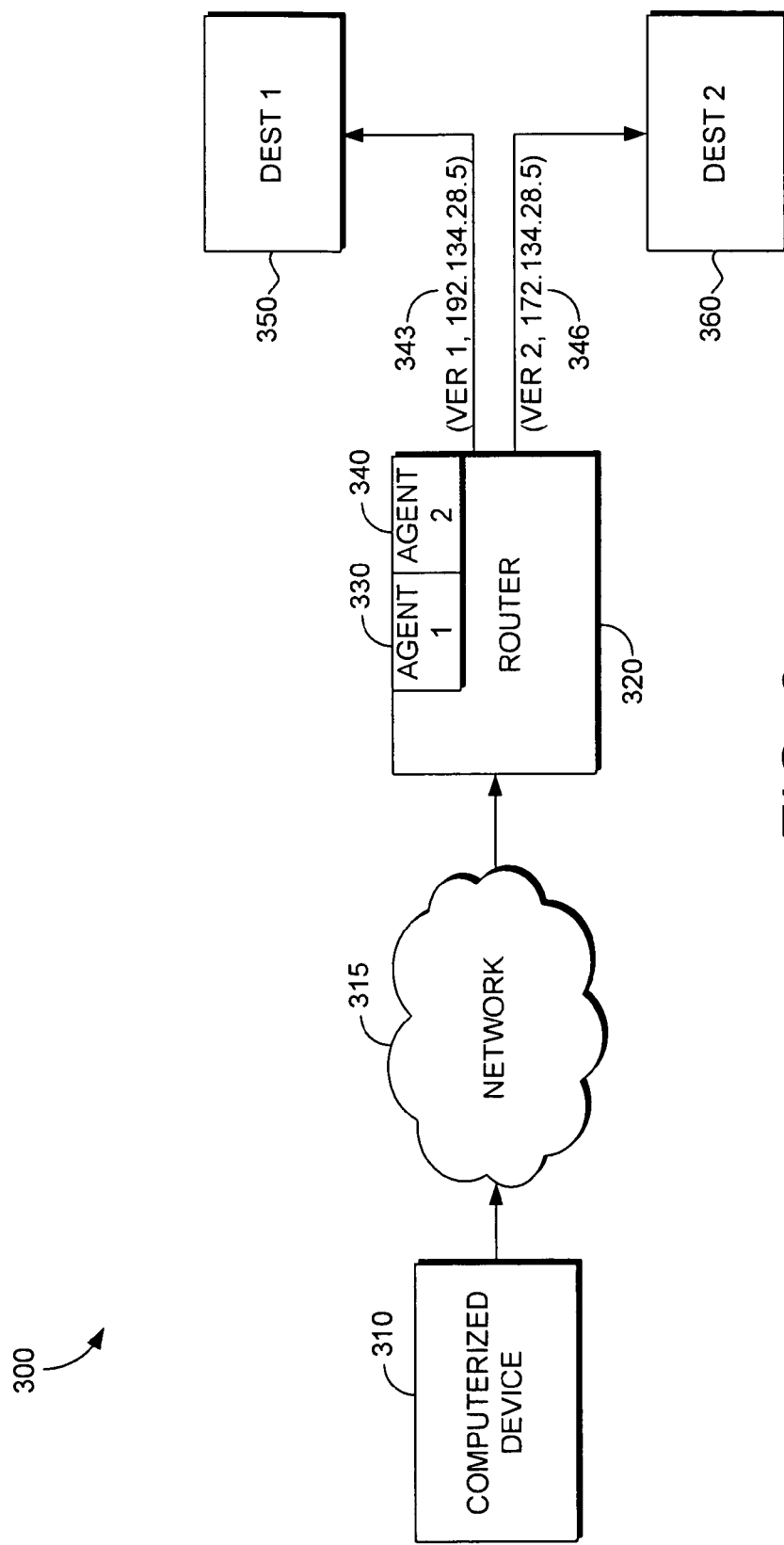
FIG. 3 provides a block diagram of an illustration of a computerized system for routing IPv4 data packets based on a variation in a version field in a header of the IPv4 packets.

FIG. 3 provides a computerized system 300 for routing IPv4 data packets based on a variation in a version field in a header of the IPv4 packets in accordance with an embodiment of the invention. As shown in FIG. 3, an exemplary system 300 includes a computerized device 310, a network 315, a router 320, an agent 330, an agent 340, a first routing address 343, second routing address 346, a first destination 350, and a second destination 360.

The computerized device 310 can be any computing device that is capable exchanging IPv4 data packets. In embodiments, computerized device 310 might be any computing device that can request, receive, and present web-based content. As such, computerized device 310 might take on a variety of forms, such as a personal computer (PC), a laptop computer, a mobile phone, a personal digital assistance (PDA), a server, a CD player, a MP3 player, a video player, a handheld communications device, a workstation, any combination of these devices, or any other device that is capable of web accessibility. In one embodiment, computerized device 310 is a mobile device that utilizes a wireless telecommunications network to communicate. Makers of illustrative mobile devices include, for example, Research in Motion®, Creative Technologies Corp., Samsung®, Apple® Computer, and the like. A mobile device can include, for example, a display, a power source (e.g., a battery), a data store, a speaker, a memory, a buffer, and the like.

Network 315 can be wired, wireless, or both. Network 315 can be combined into a single network or can include multiple networks, as well as being a network of networks, but is shown in more simple form so as to not obscure other aspects of the present invention. For example, network 315 may include one or more wide area networks (WANs), one or more local area networks (LANs), one or more public networks, such as the Internet, and/or one or more private networks. Network 315 might include an array of devices, which are not shown so as to not obscure more relevant aspects of the invention. In a wireless telecommunications network, components such as a base station, a communications tower, or even access points (as well as other components) can provide wireless connectivity in some embodiments. Although single components are illustrated for clarity, one ordinarily skilled in the art will appreciate that network 315 can enable communication between any number of user devices using, for example, Wireless Access Protocol (WAP).

Computerized device 310 may generate a first IPv4 data packet and a second IPv4 data packet. The first IPv4 data packet may have a routing address 343 of (version 1, 192.134.28.5) and the second IPv4 data packet may have a routing address 346 of (version 2, 192.134.28.5), wherein a routing address comprises a version value and a destination address value, both from the data in the fields of a first IPv4 packet and the second IPv4 packet, respectively. The first IPv4 packet may include a first version value and a first destination address value in the field in the header of the first IPv4 data packet. The second IPv4 packet may include a second version value and a second destination address value in the field in the header of the second IPv4 data packet. The first and second IPv4 packets may be transmitted over a network 315, where they may be intercepted by a router 320. Router 320 may receive the first and second IPv4 data packets, wherein the first version value in the field in the header of the first IPv4 data packet differs from the second version value in the field in the header of the second IPv4 data packet. Agent 330 at router 320 may send the first IPv4 data packet to a first destination 350 based on the first version value and the first destination address value in the first IPv4 data packet. Additionally, agent 340 at the router may send the second IPv4 data packet to a second destination 360 based on the second version value and the second destination address value in the second IPv4 data packet. Although FIG. 5 shows both agents 330 and 340, an implementation of an embodiment can have router 320 with only one agent that can route all types of IPv4 packets.

Figure 4:
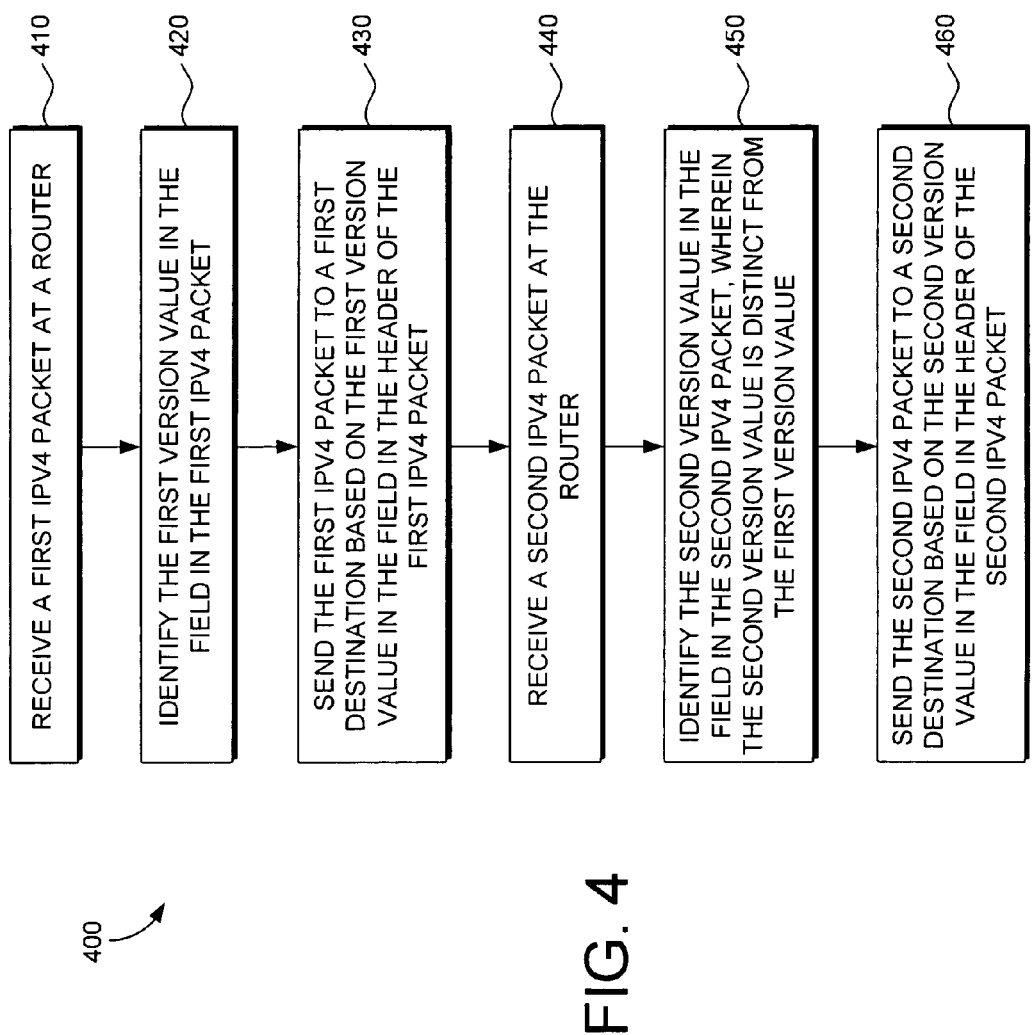
FIG. 4 provides a flow diagram that illustrates a method for routing IPv4 packets based on a variation in a field in a header of the IPv4 packets in accordance with an implementation of an embodiment of the invention.

FIG. 4 provides a flow diagram 400 that illustrates a method for routing IPv4 packets based on a variation in a field in a header of the IPv4 packets in accordance with an embodiment of the invention. Initially, at block 410, a first IPv4 packet is received at router 320. The first IPv4 packet includes a first version value in the field in the header of the first IPv4 packet. At block 420, the first version value in the field in the first IPv4 packet is identified. At block 430, the first IPv4 packet is sent to a first destination 350 based on the first version value in the field in the header of the first IPv4 packet. At block 440, a second IPv4 packet is received at the router 320. The second IPv4 packet includes a second version value. The second version value is in the field in the header of the second IPv4 packet. At block 450, the second version value in the field in the second IPv4 packet is identified. The second version value is distinct from the first version value. At block 460, the second IPv4 packet is sent to a second destination 360 based on the second version value in the field in the header of the second IPv4 packet.

Figure 5:
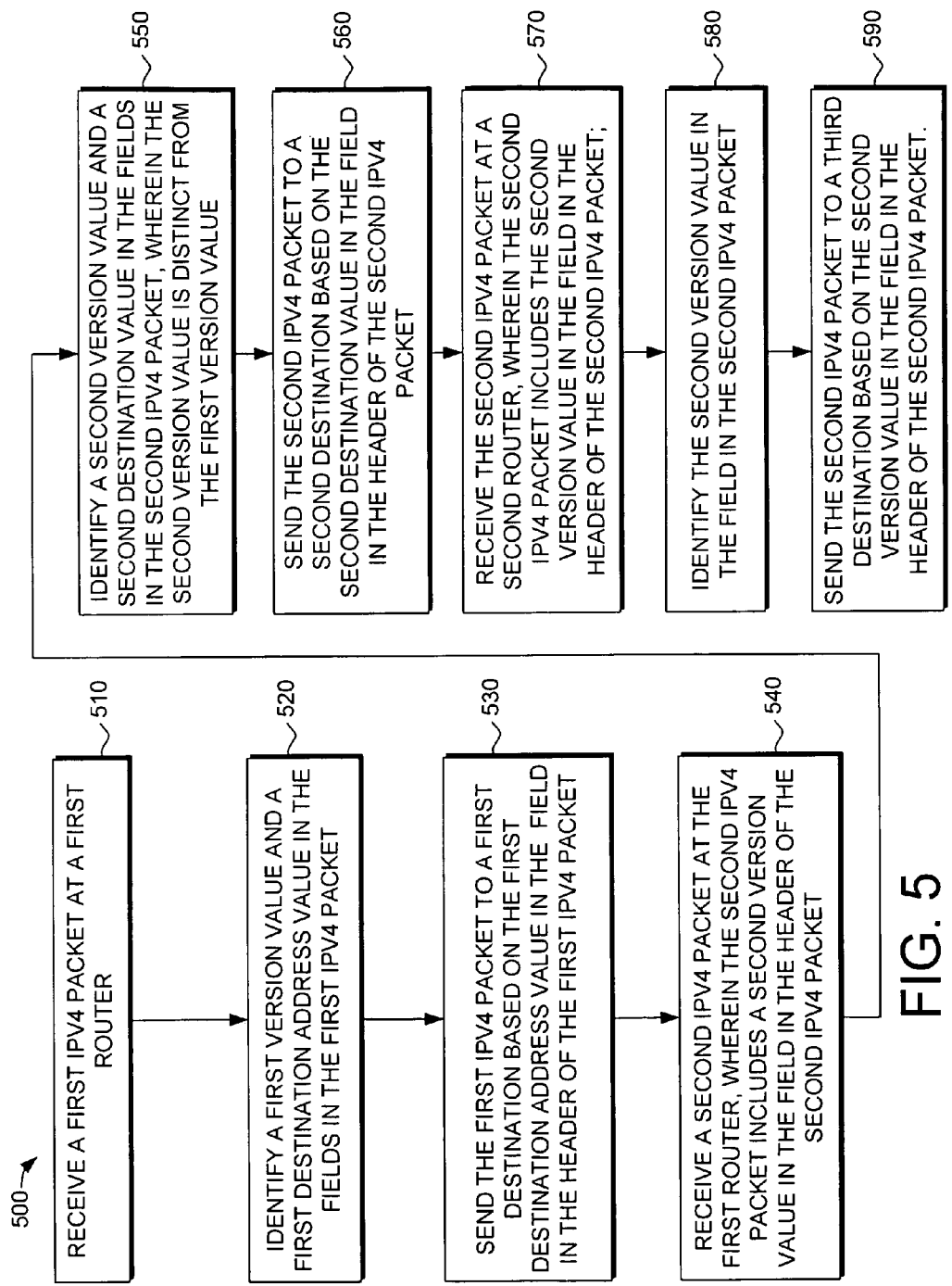
FIG. 5 provides a further flow diagram that illustrates a method for routing IPv4 packets based on a variation in a field in a header of the IPv4 packets in accordance with an implementation of an embodiment of the invention.

FIG. 5 provides a further flow diagram 500 that illustrates a method for routing IPv4 packets based on a variation in a field in a header of the IPv4 packets in accordance with an embodiment of the invention. At block 510, a first IPv4 packet is received at the router 320. The first IPv4 packet includes a first version value and a first destination address value 343, each in a field in the header of the first IPv4 packet. At block 520, the first destination address value 343 in the field of the first IPv4 packet is identified. In embodiments, the router 320 may be unable to recognize the version value in the IPv4 header. At block 530, the first IPv4 packet is sent to a first destination based on the destination address value in the destination address field in the header of the first IPv4 packet. The destination address field is distinct from the version field in the IPv4 header.

Additionally, at block 540, a second IPv4 packet is received at the first router 320. The second IPv4 packet includes a second version value and a second destination address value (346), each in a field in the header of the second IPv4 packet. At block 550, the second destination address value in the destination address field in the second IPv4 packet is identified. At block 560, the second IPv4 packet is sent to a second destination based on the second destination address value in the destination address field in the header of the second IPv4 packet. At block 570, the second IPv4 packet is received at a second router. At block 580, the second version value and the second destination address value in the fields in the second IPv4 packet are identified. At block 590, the second IPv4 packet is sent to a third destination based on the second version value in the field in the header of the second IPv4 packet.

Figure 6:
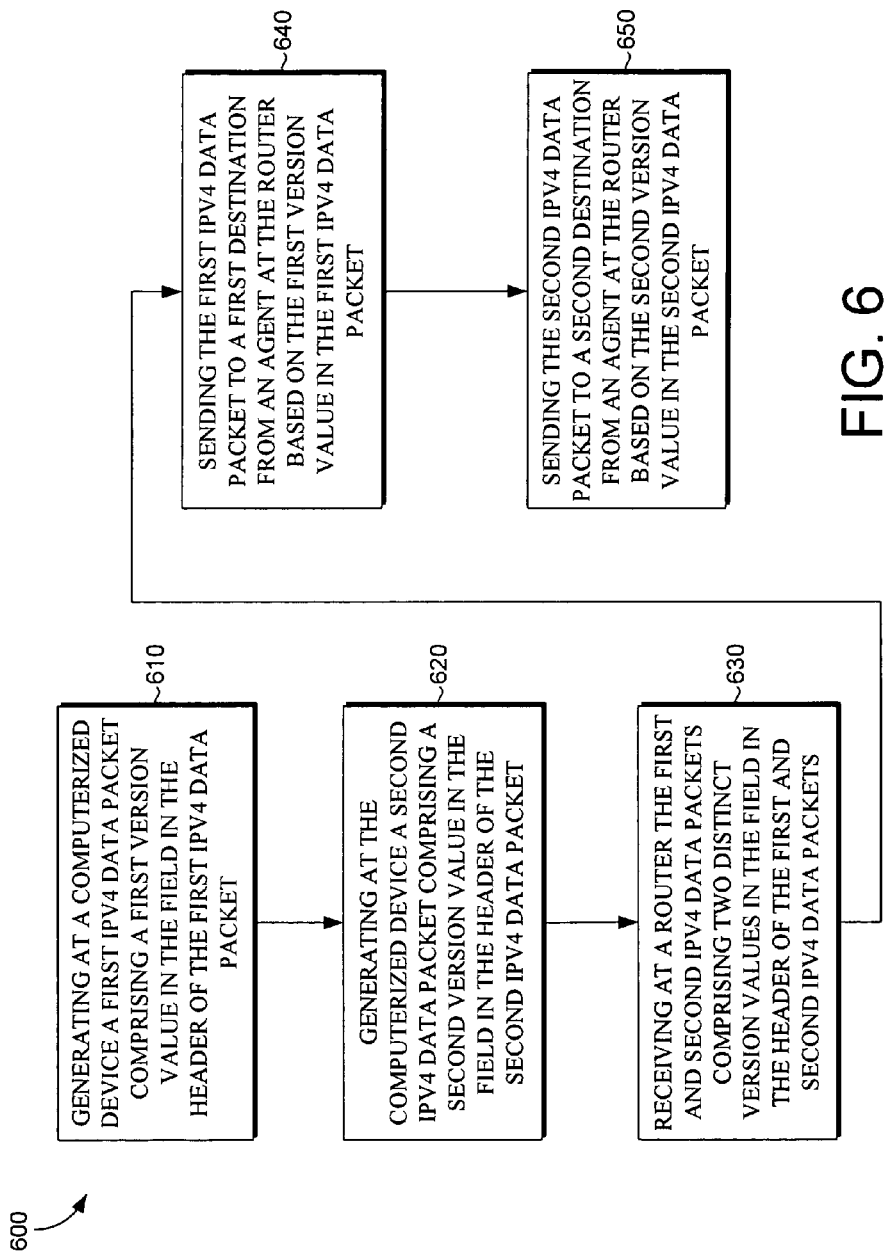
FIG. 6 provides a flow diagram of a computerized system for routing IPv4 data packets based on a variation in a field in a header of the IPv4 packets.

FIG. 6 provides a flow diagram 600 of a computerized system provided for routing IPv4 data packets based on a variation in a field in a header of the IPv4 packets, the computerized system including a processor coupled to a memory in accordance with an embodiment of the invention. Block 610 discloses generating at a computerized device a first IPv4 data packet comprising a first version value in the field in the header of the first IPv4 data packet. Block 620 discloses generating at the computerized device a second IPv4 data packet comprising a second version value in the field in the header of the second IPv4 data packet. Block 630 comprises receiving the first and second IPv4 data packets comprising two distinct version values in the field in the header of the first and second IPv4 data packets at a router. Block 640 comprises sending the first IPv4 data packet to a first destination from an agent at the router based on the first version value in the first IPv4 data packet. Block 650 comprises sending the second IPv4 data packet to a second destination from an agent at the router based on the second version value in the second IPv4 data packet.

FIG. 7 provides a further flow diagram 700 of computerized system provided for routing IPv4 data packets based on a variation in a field in a header of the IPv4 packets, the computerized system including a processor coupled to a memory in accordance with an embodiment of the invention. Block 710 discloses generating a first IPv4 data packet at a computerized device comprising a first version value in the field in the header of the first IPv4 data. Block 720 discloses generating a second IPv4 data packet at the computerized device comprising a second version value in the field in the header of the second IPv4 data packet. Block 730 discloses receiving at a first router the first and second IPv4 data packets comprising the same destination address. Block 740 discloses sending the first and second IPv4 data packets through the use of an agent to a first destination based on the matching destination address of the first and second IPv4 data packets. Block 750 discloses receiving the second IPv4 data packet at a second router. Block 760 discloses sending the second IPv4 data packet through the use of an agent at the second router to a second destination based on the second version value in the field in the header of the second IPv4 data packet.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for routing IPv4 packets based on a variation in a version field of a header of the IPv4 packets, the method comprising:
   receiving a first IPv4 packet at a router, wherein the header of the first IPv4 packet includes a first value in the version field;
   identifying a first routing address from the first value in the version field of the first IPv4 packet in combination with a destination address within the header of the first IPv4 packet;
   sending the first IPv4 packet to a first destination terminal based on the identified first routing address;
   receiving a second IPv4 packet at the router, wherein the header of the second IPv4 packet includes a second value in the version field;
   identifying a second routing address from the second value in the version field of the second IPv4 packet in combination with a destination address within the header of the first IPv4 packet, wherein the second value is distinct from the first value in the version field; and
   sending the second IPv4 packet to a second destination terminal based on the identified second routing address.

2. The method of claim 1, wherein a value in the version field comprises four bits.

3. The method of claim 1, wherein the first version value is a binary number.

4. A method for routing IPv4 packets based on a variation in a value of a version field of a header of the IPv4 packets, the method comprising:
   receiving a first IPv4 packet at a first router, wherein the header of the first IPv4 packet includes a first value in the version field in combination with a destination address within the header of the first IPv4 packet;
   identifying a first routing address from the first value in the version field of the first IPv4 packet in combination with a destination address within the header of the first IPv4 packet;
   sending the first IPv4 packet to a first destination terminal based on the identified first routing address;
   receiving a second IPv4 packet at the first router, wherein the header of the second IPv4 packet includes a second value in the version field;
   identifying a second routing address from the second value in the version field of the second IPv4 packet in combination with a destination address within the header of the first IPv4 packet, wherein the second value is distinct from the first value in the version field;
   sending the second IPv4 packet to a second destination terminal based on the identified second routing address;
   receiving the second IPv4 packet at the second destination terminal, wherein the second IPv4 packet includes a non-version value in another field in the header of the second IPv4 packet; and
   sending the second IPv4 packet to a third destination terminal based on the non-version value in the other field in the header of the second IPv4 packet.

5. The method of claim 4, wherein a value of the version field comprises four bits.

6. The method of claim 4, wherein the first value of the version field is a binary number.

7. A computerized system for routing IPv4 data packets based on a variation in a version field of a header of the IPv4 packets, the computerized system including a processor coupled to a memory, comprising:
   a computerized device that generates a first IPv4 data packet and a second IPv4 data packet, wherein the first IPv4 packet includes a first value in the version field in the header of the first IPv4 data packet, and wherein the second IPv4 packet includes a second value in the version field in the header of the second IPv4 data packet;
   a router that receives the first and second IPv4 data packets, wherein the first value in the version field in the header of the first IPv4 data packet differs from the second value in the version field in the header of the second IPv4 data packet;
   an agent at the router that sends the first IPv4 data packet to a first destination based on the first value in conjunction with a destination address in the first IPv4 data packet; and
   the agent at the router that sends the second IPv4 data packet to a second destination based on the second value in conjunction with and the destination address in the second IPv4 data packet.

* * * * *